United States Patent
Swallow et al.

(10) Patent No.: US 9,876,675 B1
(45) Date of Patent: Jan. 23, 2018

(54) PACKET TRANSPORT SHARED MESH PROTECTION

(71) Applicant: Cisco Technology, Inc., San Jose, CA (US)

(72) Inventors: George Swallow, Boston, MA (US); Eric Osborne, Sutton, MA (US)

(73) Assignee: Cisco Technology, Inc., San Jose, CA (US)

( * ) Notice: Subject to any disclaimer, the term of this patent is extended or adjusted under 35 U.S.C. 154(b) by 755 days.

(21) Appl. No.: 13/930,840

(22) Filed: Jun. 28, 2013

(51) Int. Cl.
*G06F 15/16* (2006.01)
*H04L 12/24* (2006.01)
*H04L 12/723* (2013.01)
*H04L 12/867* (2013.01)

(52) U.S. Cl.
CPC .......... *H04L 41/0806* (2013.01); *H04L 45/50* (2013.01); *H04L 47/629* (2013.01)

(58) Field of Classification Search
CPC ... H04L 47/623; H04L 47/52; H04L 47/2441; H04L 12/5693; H04L 47/50; H04L 41/0806; H04L 45/22; H04L 45/28; H04L 45/50; H04L 47/629; H04L 47/72; H04L 47/728; H04L 47/825
See application file for complete search history.

(56) References Cited

U.S. PATENT DOCUMENTS

| | | | |
|---|---|---|---|
| 5,742,604 A | | 4/1998 | Edsall et al. |
| 6,452,933 B1 * | | 9/2002 | Duffield .............. H04L 12/5602 370/415 |
| 7,230,913 B1 | | 6/2007 | Vasseur et al. |
| 7,433,966 B2 | | 10/2008 | Charny et al. |
| 7,606,154 B1 * | | 10/2009 | Lee .......................... H04J 3/14 370/232 |
| 7,936,770 B1 * | | 5/2011 | Frattura .................. H04L 49/90 370/351 |

(Continued)

OTHER PUBLICATIONS

Cheung, et al., "MPLS-TP Shared Mesh Protection", MPLS Working Group, Internet-Draft, draft-cheung-mpls-tp-mesh-protection-05.txt, Mar. 2012, 23 pages, Internet Engineering Task Force Trust.

(Continued)

*Primary Examiner* — Lance L Barry
(74) *Attorney, Agent, or Firm* — Parker Ibrahim & Berg LLC; James M. Behmke; Stephen D. LeBarron (57) ABSTRACT

In one embodiment, primary circuits may be established on a network link, where each primary circuit individually allocates primary bandwidth of the network link and is assigned to one of either a respective primary weighted queue of the network link corresponding to a size of the respective primary circuit or a shared primary weighted queue of the network link corresponding to a total size of the individually allocated primary bandwidth for the network link. In addition, protection circuits may also be established on the network link, where the protection circuits collectively allocate shared backup bandwidth of the network link and are assigned to a shared backup weighted queue of the network link corresponding to a size of the shared backup bandwidth for the network link. As such, primary and backup packets may be forwarded on the network link according to the primary and backup weighted queues (e.g., allowing 1:1 protection).

23 Claims, 7 Drawing Sheets

(56) References Cited

U.S. PATENT DOCUMENTS

| | | | |
|---|---|---|---|
| 7,986,618 B2 | 7/2011 | Charny et al. | |
| 8,797,844 B1 * | 8/2014 | Strahle | H04L 45/28 370/219 |
| 2002/0097677 A1 * | 7/2002 | Hoar | H04L 47/10 370/230 |
| 2006/0031490 A1 * | 2/2006 | Provine | H04L 45/00 709/225 |
| 2008/0253281 A1 * | 10/2008 | Li | H04L 12/5695 370/218 |
| 2013/0223237 A1 | 8/2013 | Hui et al. | |

OTHER PUBLICATIONS

Pan, et al., "Supporting Shared Mesh Protection in MPLS-TP Networks", Network Working Group, Internet Draft, draft-pan-shared-mesh-protection-04.txt, Mar. 2012, 19 pages, Internet Engineering Task Force Trust.

* cited by examiner

PACKET TRANSPORT SHARED MESH PROTECTION

TECHNICAL FIELD

The present disclosure relates generally to computer networks, and, more particularly, to backup tunnels and shared mesh protection in the computer networks.

BACKGROUND

In order to protect against failures in a computer network, network devices, such as routers, may establish protection circuits or "backup tunnels" over paths that offer an alternative to a protected network element (e.g., link or node). The economics of backup bandwidth coupled with the ability to more easily perform computational analysis of backup paths has renewed interest in shared mesh protection, with shared risk link group (SRLG) diversity as one of the primary focuses.

With most low to medium speed (=<1 G) and some 10 G long haul transport services moving to packet, shared mesh protection becomes of interest in this domain as well. Shared Mesh Protection has traditionally been dealt with by allocating shared resources ahead of time, but not making the actual data plane connections (though some current techniques utilize partial path setup) until the failure occurs. The two issues that have caused the evolution in this direction are that traditional (non-packet) transport services only allow one circuit to be active on a given set of facilities (e.g. channel, sub-channels, lightwaves, x-connects) at a time, and that SRLGs are not perfect: simultaneous or very near simultaneous failures can occur.

Packet transport, (e.g., multiprotocol label switching, "MPLS") allows multiple circuits (i.e., label bindings in MPLS) to be simultaneously setup. Current recovery mechanisms, however, impact circuits which otherwise would not be affected by a failure event, when an unanticipated or improperly-planned-for failure event occurs, leading to over-utilization of some facilities.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, one or more primary circuits may be established on a network link, where each primary circuit individually allocates primary bandwidth of the network link and is assigned to one of either a respective primary weighted queue of the network link corresponding to a size of the respective primary circuit or a shared primary weighted queue of the network link corresponding to a total size of the individually allocated primary circuit bandwidth for the network link. In addition, one or more protection circuits may also be established on the network link, where the protection circuits collectively allocate shared backup bandwidth of the network link and are assigned to a shared backup weighted queue of the network link corresponding to a size of the shared backup bandwidth for the network link. As such, primary and backup packets may be forwarded on the network link according to the primary and backup weighted queues, allowing shared mesh protection to be enabled using simple protection mechanisms (e.g., 1:1 protection).

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
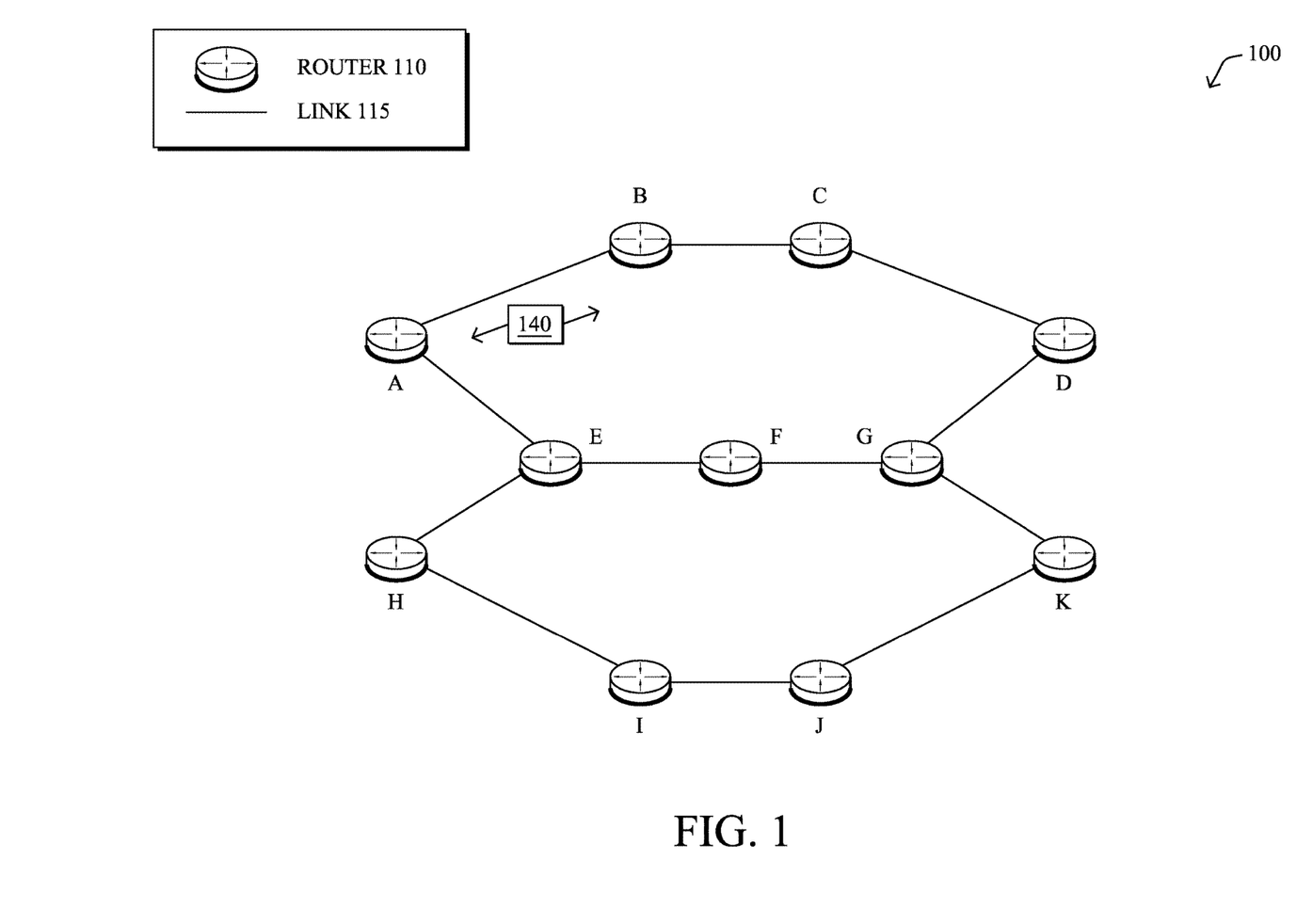
FIG. 1 illustrates an example computer network.

FIG. 1 is a schematic block diagram of an example computer network 100 illustratively comprising nodes/devices, such as a plurality of routers 110 (e.g., routers A through K) interconnected by links 115, as shown. As used herein, links may be labeled by their corresponding endpoints, such as the link between nodes A and B being referred to herein as "link AB" (or equally "link BA"). Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic/messages) may be exchanged among the nodes/devices 110 of the computer network 100 over links 115 using predefined network communication protocols such as the Transmission Control Protocol (TCP), User Datagram Protocol (UDP), IPv4/IPv6, Asynchronous Transfer Mode (ATM) protocol, Frame Relay protocol, etc.

Figure 2:
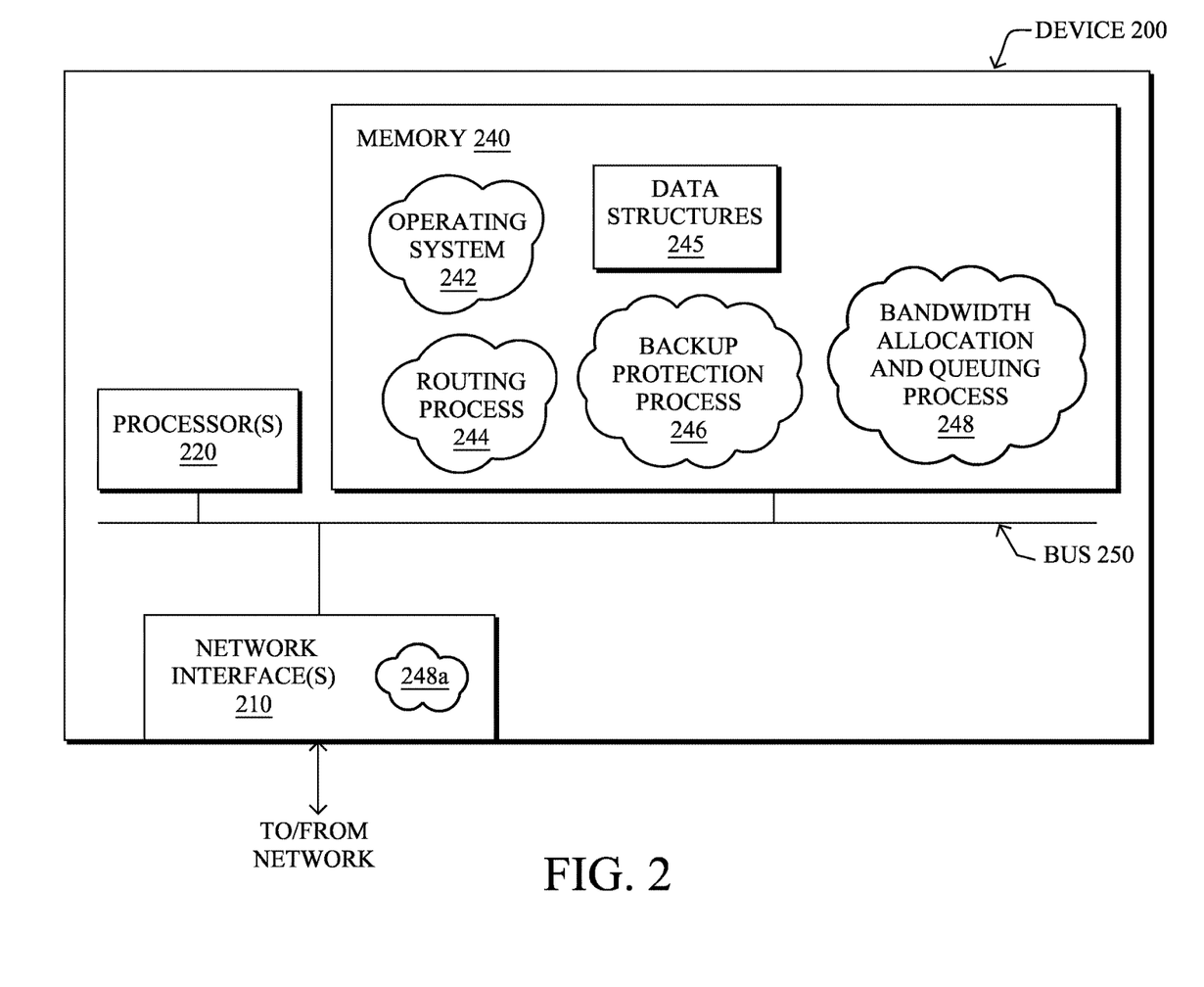
FIG. 2 illustrates an example network device/node.

FIG. 2 is a schematic block diagram of an example node/device 200 that may be used with one or more embodiments described herein, e.g., as a router 110. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and a backup protection process 246 that may, for example, facilitate the signaling and establishment of backup tunnels as described herein. Additionally, these software processes and/or services may further comprise a bandwidth allocation and queuing process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

Backup protection process 246 contains computer executable instructions executed by processor 220 to perform functions provided by one or more backup protection protocols, such as "1:1" protection as will be understood by those skilled in the art, and according to the techniques (e.g., extensions to conventional protocols) that are described in detail below. Generally, for 1:1 protection, tunnels or circuits may be protected by creating corresponding backup tunnels (protection circuits) that generally avoid the protected links and nodes. The backup tunnels may traverse one or more backup links to reach either a merge point (MP) on the primary tunnel/circuit, which takes traffic diverted onto the backup tunnel and reinserts it into the data stream, or an end point of the primary tunnel/circuit, having bypassed the failed link (or having detoured around the failed node). In particular, a connectivity verification protocol such as bidirectional forwarding detection (BFD) may be operated on the primary tunnel/circuit, such that in response to a detected failure on the primary, the traffic may be switched to the pre-established secondary.

Collectively, routing services 244 and/or backup protection services 246 may establish primary circuits (e.g., tunnels/paths) and backup or protection circuits using various known protocols, such as the Resource reSerVation Protocol (RSVP), GMPLS (e.g., establishing label switched paths or "LSPs"), etc., as may be appreciated by those skilled in the art. For instance, according to one or more embodiments herein, a point of local repair (PLR) along a primary circuit (e.g., the head-end node or any intermediate node) may use advertised backup bandwidth capacities of network links in order to calculate a backup path (e.g., a shortest path) from the PLR to a merge point (MP) or end point that meets the constraints. Illustratively, a constrained shortest path first (CSPF) path computation may be utilized, as may be appreciated by those skilled in the art, although other constrained path computation techniques may also be used (e.g., distance vector, etc.).

Notably, backup bandwidth capacities for links in a computer network may be learned, such as where backup bandwidth capacity values may be distributed among the nodes of the network by manual configuration (e.g., by an administrator) or through one or more dynamic discovery protocols. For example, to learn the backup bandwidth capacity, a new object may be added to IGP messages (e.g., within a particular type-length-value (TLV) object) that indicates backup bandwidth capacity for a link when that link is being advertised. As such, nodes in the network may advertise the backup bandwidth capacities of their respective local links to the rest of the network (e.g., in a message 140). Note that the backup bandwidth capacities may be static values, such as based on the physical characteristics of the links 115, or dynamic values. That is, the backup bandwidth capacity values may change dynamically, such as in response to other reservations and/or traffic utilization (e.g., as described herein), and the corresponding nodes may update (re-advertise) the new values within the network, accordingly.

As noted above, shared mesh protection has become an interesting topic, with shared risk link group (SRLG) diversity as one of the primary focuses, since many transport services are now moving to packet-based protocols. Examples of such shared mesh protection can be found in various literature, such as an Internet Engineering Task Force (IETF) Internet Draft entitled "MPLS-TP Shared Mesh Protection" <draft-cheung-mpls-tp-mesh-protection> by Cheung, et al. (March 2012), and another entitled "Supporting Shared Mesh Protection in MPLS-TP Networks" <draft-pan-shared-mesh-protection> (March 2012).

Shared Mesh Protection has traditionally been dealt with by allocating shared resources ahead of time, but not making the actual data plane connections (though some current techniques utilize partial path setup) until the failure occurs. There are two issues that have caused the evolution in this direction. First, for traditional (non-packet) transport services only one circuit can be active on a given set of facilities (e.g. channel, sub-channels, lightwaves, x-connects) at a time. The second reason, is that SRLGs are not perfect: simultaneous or very near simultaneous failures can occur. These are due to the fact that SRLG information may be incomplete or out-of-date or due to unanticipated failure events, such as a train derailment which affects multiple conduits or a fire which affects an entire point of presence (POP).

Packet transport, (e.g., MPLS) allows multiple circuits (i.e., label bindings in MPLS) to be simultaneously setup. Current recovery mechanisms, however, impact circuits which otherwise would not be affected by a failure event, when an unanticipated or improperly-planned-for failure event occurs, leading to over-utilization of some facilities.

Packet Transport Shared Mesh Protection

The techniques herein use a weighted queuing mechanism (e.g., weighted fair queuing, "WFQ", deficit round robin, "DRR", or other queuing mechanism) to allocate bandwidth to the protection path in a manner that pre-stages a repair so that a bandwidth guarantee can be preserved at all times, while keeping bandwidth available to other services until it is needed by the protected service. In particular, signaling extensions (e.g., RSVP/GMPLS, etc.) may indicate that a fully established backup path is being created using shared backup bandwidth, while further signaling extensions may be invoked upon a failure to move the circuit/LSP bandwidth from a shared mesh backup pool to a general (primary circuit) pool. Accordingly, the techniques herein allow for 1:1 protection of primary circuits onto secondary (protection) circuits that share the backup bandwidth.

Specifically, according to one or more embodiments of the disclosure as described in detail below, one or more primary circuits may be established on a network link, where each primary circuit individually allocates primary bandwidth of the network link and is assigned to one of either a respective primary weighted queue of the network link corresponding to a size of the respective primary circuit or a shared primary weighted queue of the network link corresponding to a total size of the individually allocated primary bandwidth for the network link. In addition, one or more protection circuits may also be established on the network link, where the protection circuits collectively allocate shared backup bandwidth of the network link and are assigned to a shared backup weighted queue of the network link corresponding to a size of the shared backup bandwidth needed in the event of any single anticipated network failure for the network link. As such, primary and backup packets may be forwarded on the network link according to the primary and backup weighted queues (e.g., using 1:1 protection).

Illustratively, the techniques described herein may be performed by hardware, software, and/or firmware, such as in accordance with the bandwidth allocation and queuing process 248/248a, which may contain computer executable instructions executed by the processor 220 (or independent processor of interfaces 210) to perform functions relating to the techniques described herein, e.g., in conjunction with routing process 244 and/or backup protection process 246. For example, the techniques herein may be treated as extensions to conventional protocols, such as RSVP/MPLS/GMPLS/etc., and as such, may be processed by similar components understood in the art that execute those protocols, accordingly.

(Note: Much of the literature on this subject uses the terms protection and restoration interchangeably, generally in the sense of the latter—which in more precise terminology is re-establishing a circuit upon failure. In this disclosure, the more precise definition of protection is used, meaning a backup path that is completely setup can be made immediately available upon detection of a failure.)

Figure 3:
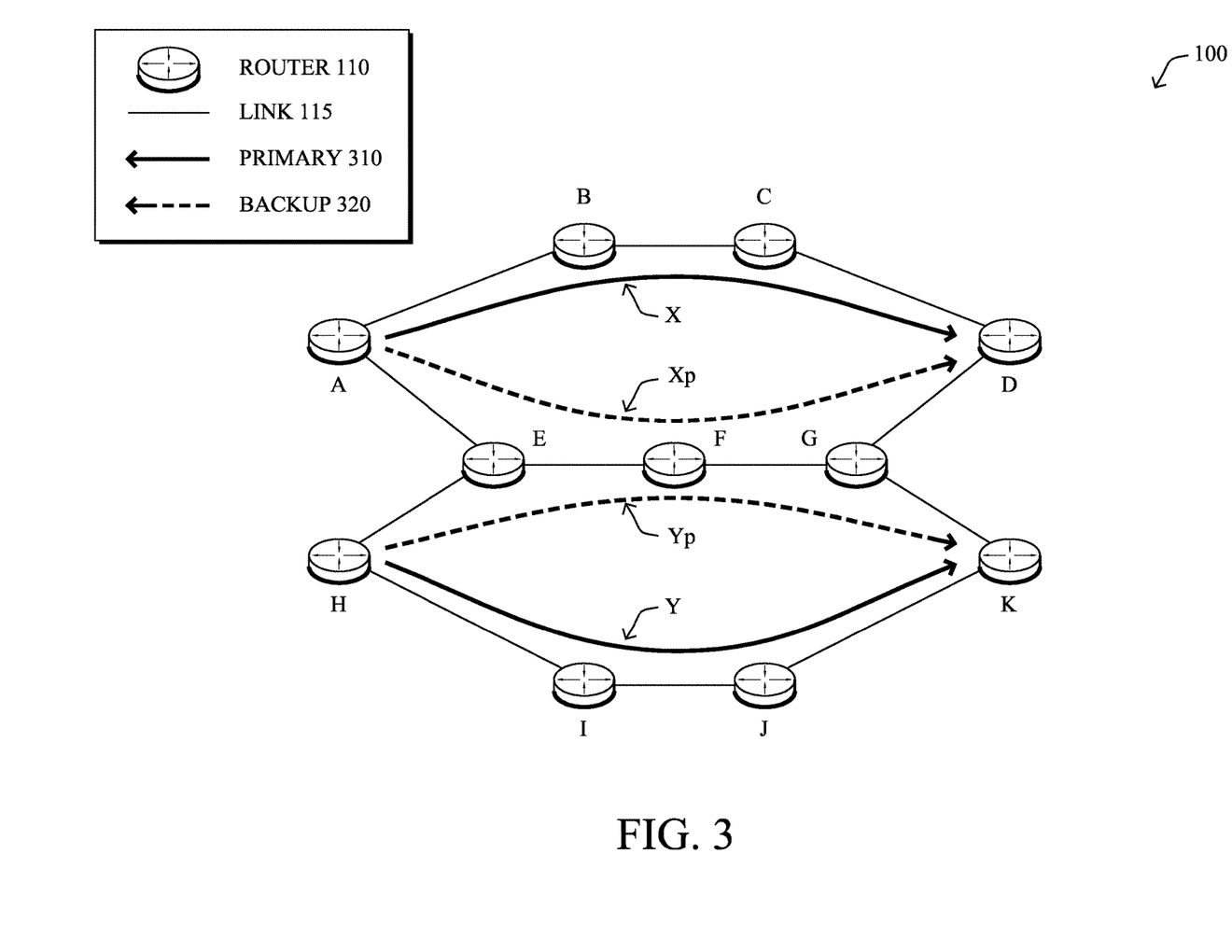
FIG. 3 illustrates an example of primary and protection circuits.

Operationally, according to shared mesh protection, pre-planned shareable SRLG diverse paths are found. For example, as shown in FIG. 3, suppose primary circuits 310 "X" (A-B-C-D) and "Y" (H-I-J-K) are SRLG diverse. Suppose further that protection circuits 320 "Xp" (A-E-F-G-D) and "Yp" (H-E-F-G-K) are found which are SRLG diverse of A and B respectively. If paths Xp and Yp are not SRLG diverse of each other (which they are not: E-F-G), then there exists the situation of shared mesh protection. Notably, such SRLG schemes are based on the assumption that the simultaneous failure of two SRLGs has an acceptably low probability.

The protection paths Xp and Yp are set up with an indication that they are protection circuits whose bandwidth may be shared with other protection circuits. In other words, for any links that Xp and Yp share in common, the required backup capacity may be shared. According to one or more embodiment herein, when protection circuits are established, they may be signaled with an explicit indication of allowing allocation of shared backup bandwidth.

Figure 4A:
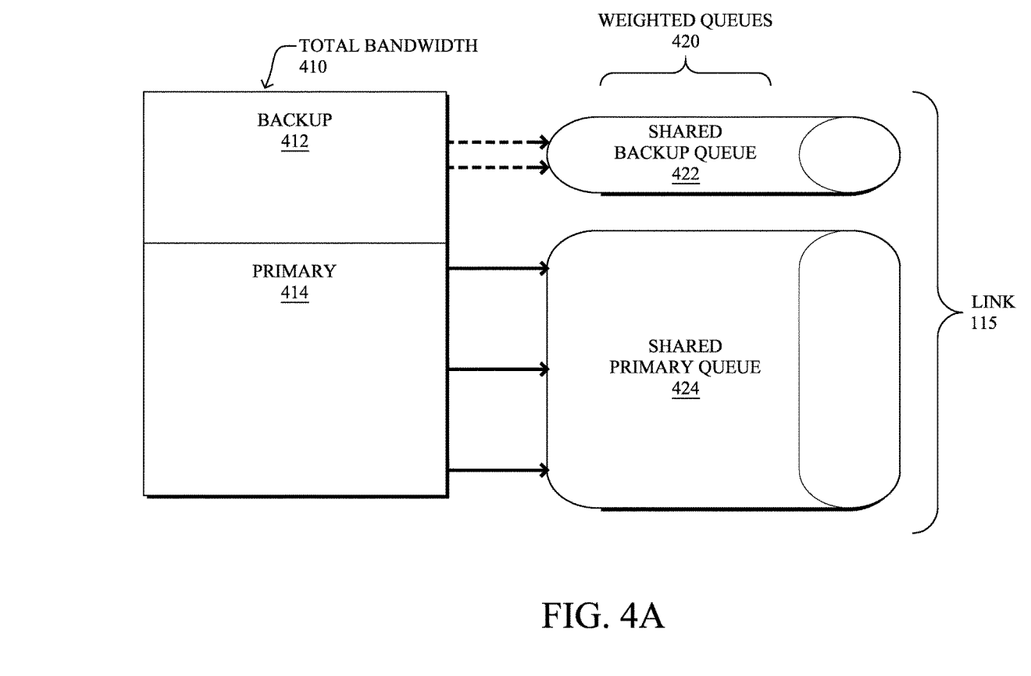
FIGS. 4A-4B illustrate examples of bandwidth allocation and queuing.
Figure 4B:
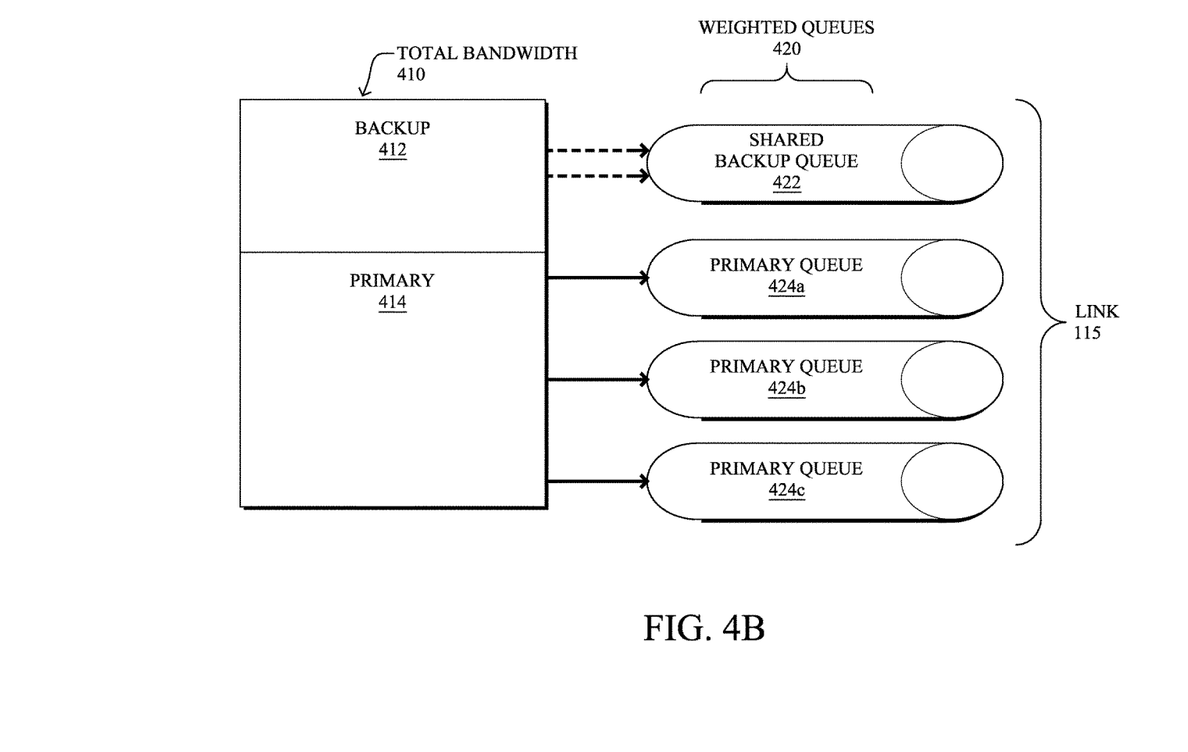

In particular, as shown in FIGS. 4A and 4B, according to the techniques herein, the total bandwidth 410 of each link may be divided into two "pools," called primary 414 and backup 412. (Note that the division between the pools may be flexible/dynamic based on the arrival of various circuit setup/teardown messages or other bandwidth utilization adjustments for the link.) All the bandwidth in the backup pool 412 is assigned to a weighted queue 422 (e.g., a weighted fair queue (WFQ), a deficit round robin (DRR) queue, a deficit weighted round robin (DWRR) queue, or similar queuing mechanism) whose weight is set to the size of the backup pool, for weighting compared to all weighted queues 420 of the link 115. Said differently, protection circuits 320 established on the network link collectively allocate the shared backup bandwidth 412, and are assigned to a shared backup weighted queue 422 corresponding to a size of the shared backup bandwidth 412 for the network link.

Alternatively, all of the primary circuits 310 (as well as any bandwidth committed to other packet services) may be assigned to a shared primary weighted queue 424 (FIG. A) their own primary weighted queues 424a-c (FIG. 4B). That is, primary circuits established on the network link 115 individually allocate primary bandwidth 414 of the network link and are assigned to one of either a shared primary weighted queue 424 of the network link corresponding to a total size of the individually allocated primary bandwidth for the network link or a respective primary weighted queue 424 (e.g., 424a, 424b, 424c, etc.) of the network link corresponding to a size of the respective primary circuit. Other, more complex, examples of primary queue division may be available, and the two views shown in FIGS. 4A and 4B herein are merely examples. (Notably, whether there is a single shared queue, individual queues, or other combinations for the primary circuits, the important factor is that the total size of the primary queues is based on the total bandwidth of all primary circuits on the link. Conversely, the backup queue is generally based on the maximum bandwidth needed to protect against a single anticipated network failure, e.g., the largest of 424a, b, or c, or the failure of an SRLG).

As an example, assume that link E-F carries backup circuits Xp and Yp, and also three primary circuits Pa, Pb, and Pc. If link E-F is a 500M link, the bandwidth 410 may be divided a priori into primary and backup pools (e.g., 400M and 100M), or else may allocate primary bandwidth in response to specifically active primary circuits. Regardless, assume that primary bandwidth 414 is 400M and backup bandwidth 412 is 100M. For ease of illustration, assume that each circuit (Xp, Yp, and Pa-Pc) are each 100M circuits, where the backup/protection circuits share the backup bandwidth on the link (e.g., 100M+100M=shared 100M). As such, with reference to FIG. 4A, the weighted queues 420 may be assigned to a shared primary queue 424 and the shared backup queue 422 as follows:

Pa+Pb+Pc weight=300; and

Xp and Yp shared weight=100.

Alternatively, with reference to FIG. 4B, the weighted queues 420 may be assigned to individual primary queues 424 and the shared backup queue 422 as follows:

Pa weight=100;

Pb weight=100;

Pc weight=100; and

Xp and Yp shared weight=100.

In this manner, should Xp and/or Yp be activated in response to failure of X or Y, the weight (and performance) of the primary queues 424 remain unaffected.

In particular, according to the techniques herein, linear protection mechanisms are run on both working (primary) and protection (backup) pairs ((X and Xp) and (Y and Yp)), thus forwarding primary and backup packets on the network links according to the primary and backup weighted queues (424 and 422, respectively). If properly planned, then only X or Y should fail at a given time, and the protection will work properly (i.e., conventional linear protection mechanisms will be invoked ensuring fast protection). If, however, there has been an error in planning, or the rare event of simultaneous SRLG failures has occurred, then the weighted queuing mechanism will prevent the induced link overload from affecting other circuits, which is essential to transport operators in order to meet their service level agreement (SLA) commitments.

Figure 5:
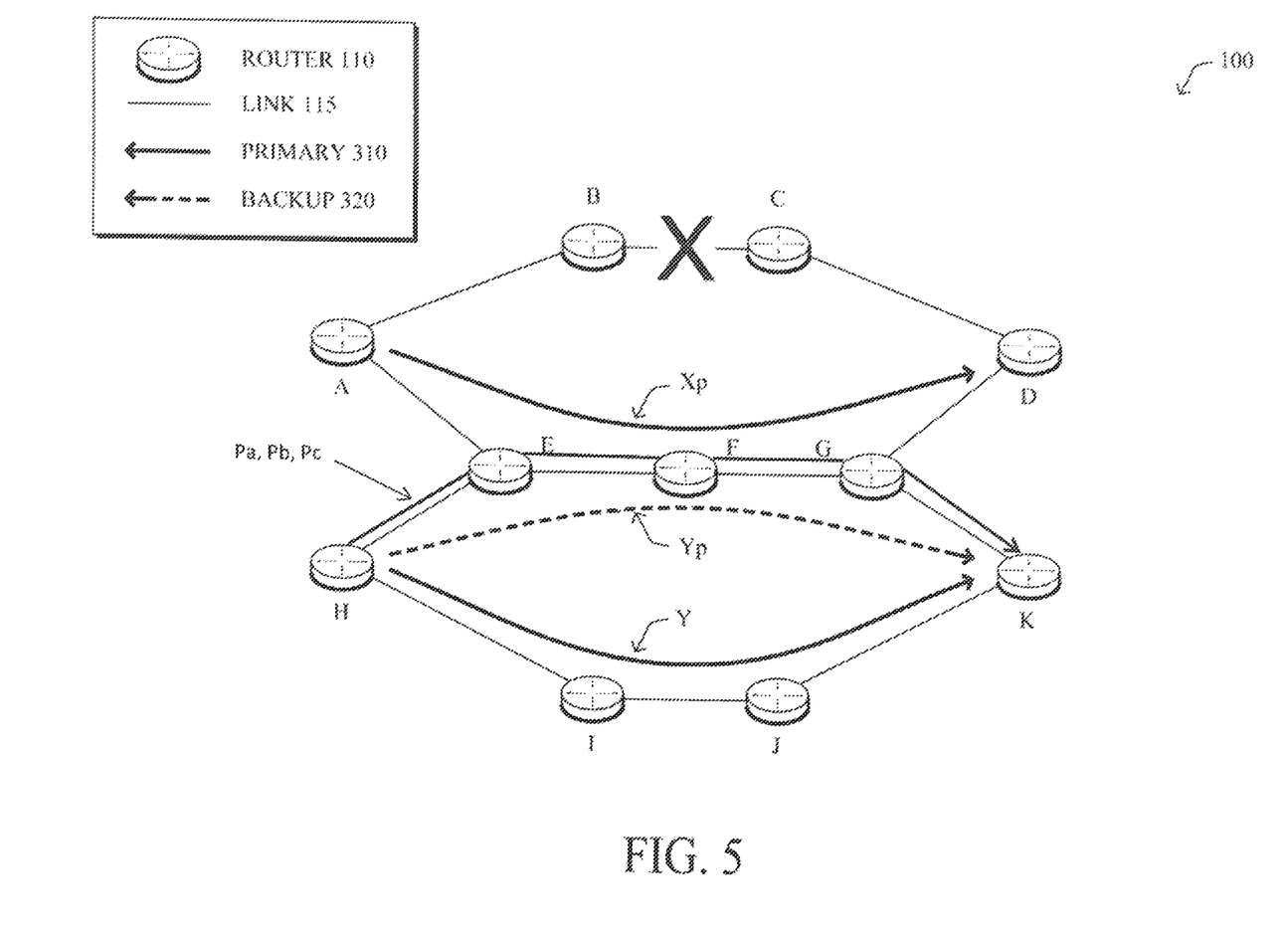
FIG. 5 illustrates an example situation causing bandwidth reallocation.

After a failure event, signaling may be used to claim the resources that are now in use, thus converting backup bandwidth into primary bandwidth. For instance, as shown in FIG. 5, suppose X has failed. Xp may be re-signaled requesting dedicated bandwidth for an active protection path (becoming an "active" circuit). If only Xp is making this request, then the resources needed by Xp may be moved from the weighted queue 422 for shared protection (with this queue reduced in weight) and put into a corresponding primary queue 424 (e.g., shared primary queue or its own primary queue). In other words, a portion of the shared backup bandwidth 412 may be reallocated as primary bandwidth 414 in response to a new active circuit on the network link (e.g., a new primary circuit or a newly activated backup/protection circuit), where the shared backup weighted queue 422 may be adjusted according to a resultant new size of the shared backup bandwidth 412 for the network link (assuming it has changed in response to the reallocation).

Notably, if there is now insufficient bandwidth in the shared backup pool 412 for Yp (or any other shared protection path) then Yp may be torn down (and re-signaled along another path if possible). In the event that more circuits have failed than can be accommodated, then there are various existent schemes to adjudicate between these (e.g., "claiming" functions as may be understood in the art).

Figure 6:
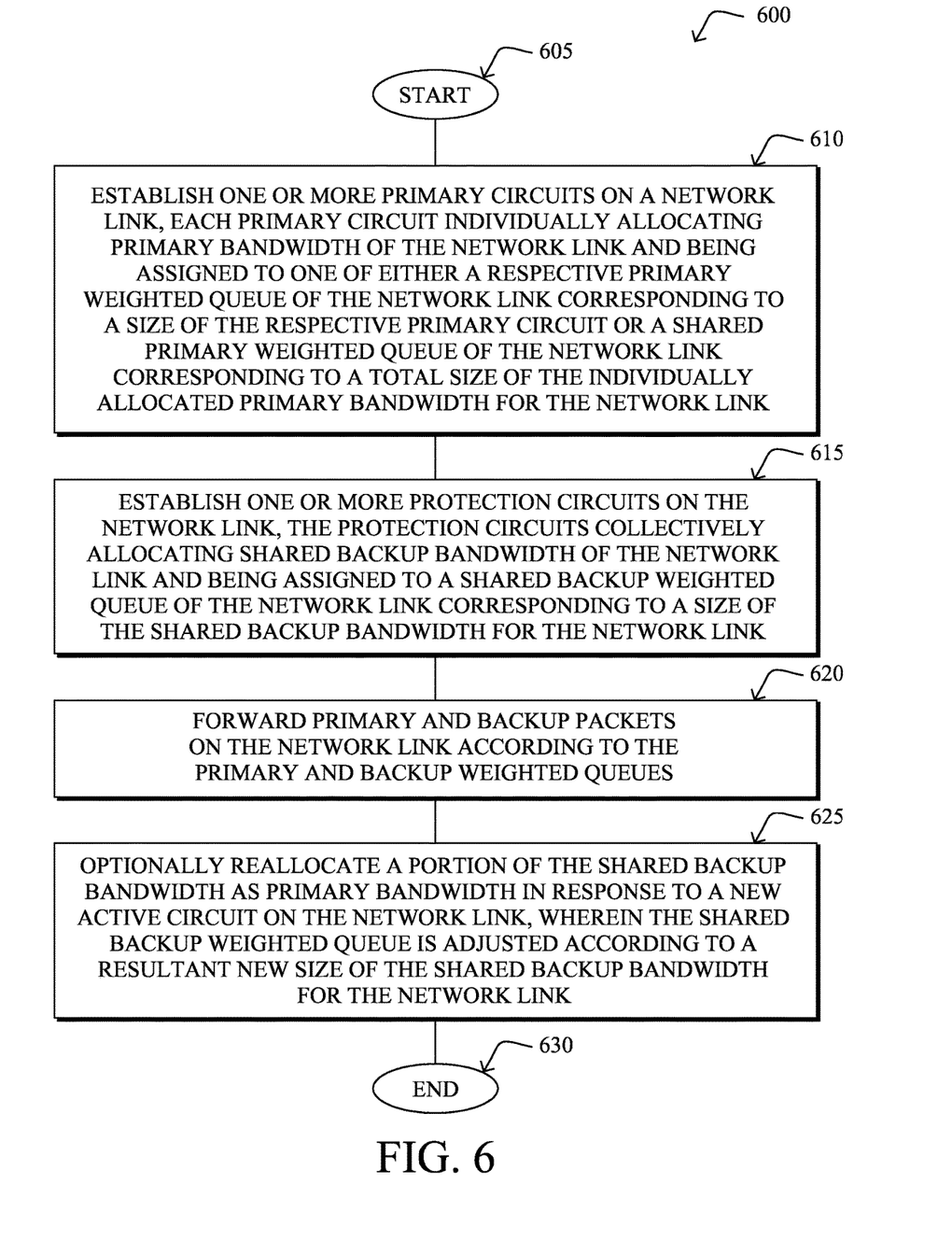
FIG. 6 illustrates an example simplified procedure for packet transport shared mesh protection in a computer network.

FIG. 6 illustrates an example simplified procedure 600 for packet transport shared mesh protection in a computer network in accordance with one or more embodiments described herein. The procedure 600 may start at step 605, and continues to step 610, where, as described in greater detail above, one or more primary circuits 310 may be established on a network link 115, each primary circuit individually allocating primary bandwidth 414 of the network link and being assigned to one of either a respective primary weighted queue of the network link corresponding to a size of the respective primary circuit or a shared primary weighted queue of the network link corresponding to a total size of the individually allocated primary bandwidth for the network link. Also, in step 615, one or more protection circuits 320 may be established on the network link, the protection circuits collectively allocating shared backup bandwidth 412 of the network link and being assigned to a shared backup weighted queue 422 of the network link corresponding to a size of the shared backup bandwidth for the network link. Accordingly, in step 620, primary and backup packets 140 may be forwarded on the network link according to the primary and backup weighted queues, as described above (e.g., based on activity and/or failure of the circuits, such as for 1:1 protection). Notably, as mentioned above, in step 625 a portion of the shared backup bandwidth may be optionally reallocated as primary bandwidth in response to a new active circuit on the network link (e.g., a backup circuit becoming an active circuit in response to failure of a corresponding primary circuit), where the shared backup weighted queue is adjusted according to a resultant new size of the shared backup bandwidth for the network link. The procedure 600 may illustratively end in step 630, though primary and backup circuits may continue to be established (and torn down), and packets may continue to be forwarded over such circuits according to their corresponding weighted queues.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for packet transport shared mesh protection in a computer network. In particular, by defining an efficient weighted queuing assignment for protection circuits, the techniques herein ensure continued SLA guarantees on non-failed circuits while allowing for shared mesh protection, thus allowing a service provider to deploy such a service for reliable backup at a significantly lower cost. For instance, the techniques herein allow for efficient 1:1 protection of primary circuits onto secondary (protection) circuits that share the backup bandwidth. Also, the dynamic aspects of one or more embodiments described herein alleviate the need for cumbersome and inefficient manual configuration.

Notably, unlike the techniques herein, no known techniques regarding shared mesh protection completely set up backup paths so that they are available for cutover speeds equivalent to linear protection (e.g., <50 ms). Instead, current techniques merely apply general transport solutions to packet transport, which is not a complete solution. for instance, each of the IETF internet drafts noted above pre-allocate resources and use OAM (operations, administration, and management) messaging or signaling to "claim" the resources upon failure. The techniques herein, however, allow for real-time contention resolution via packet priority while also providing a signaling solution for longer timescales.

While there have been shown and described illustrative embodiments that provide for packet transport shared mesh protection in computer networks, it is to be understood that various other adaptations and modifications may be made within the spirit and scope of the embodiments herein. For example, the embodiments have been shown and described herein with relation to particular network protocols, such as MPLS, GMPLS, RSVP, etc. However, the embodiments in their broader sense are not as limited, and may, in fact, be used with other similar types of signaling protocols as well. In addition, while certain network configurations are shown, such illustrations are merely examples, and are not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    establishing one or more primary circuits on a network link, each primary circuit individually allocating primary bandwidth of the network link;
    establishing one or more protection circuits on the network link configured to protect one or more other primary circuits in the network, the protection circuits collectively allocating shared backup bandwidth of the network link;
    assigning each primary circuit to one of either:
        an individual primary weighted queue of the network link corresponding to a size of the individual primary circuit, or
        a shared primary weighted queue of the network link, wherein a total size of the shared primary weighted queue is equal to a total bandwidth of all primary circuits established on the network link;
    assigning the one or more protection circuits collectively to a shared backup weighted queue of the network link, wherein a total size of the shared backup weighted queue is based on a maximum bandwidth needed to protect against a single failure of any one of one or more other primary circuits associated with the one or more protection circuits; and
    forwarding primary and backup packets on the network link according to the primary and backup weighted queues.

2. The method as in claim 1, wherein forwarding comprises:
    performing 1:1 protection operations based on the primary and backup queues.

3. The method as in claim 1, further comprising:
    reallocating a portion of the shared backup bandwidth as primary bandwidth in response to a new active circuit on the network link, wherein the shared backup weighted queue is adjusted according to a resultant new size of the shared backup bandwidth for the network link.

4. The method as in claim 3, wherein the new active circuit is a re-signaling of an old protection circuit of the one or more protection circuits established on the network link.

5. The method as in claim 1, wherein establishing the one or more protection circuits comprises signaling an explicit indication of allowing allocation of shared backup bandwidth.

6. The method as in claim 5, wherein signaling is based on a protocol selected from a group consisting of: resource reservation protocol (RSVP); and generalized MPLS (GMPLS).

7. The method as in claim 1, wherein the primary and backup weighted queues are selected from a group consisting of: a weighted fair queue (WFQ); a deficit round robin (DRR) queue; and a deficit weighted round robin (DWRR) queue.

8. The method as in claim 1, wherein the primary and protection circuits are multiprotocol label switching (MPLS) label switched paths (LSPs).

9. An apparatus, comprising:
    one or more network interfaces to communicate on links within a computer network;
    a processor coupled to the network interfaces and adapted to execute one or more processes; and
    a memory configured to store a process executable by the processor, the process when executed operable to:
        establish one or more primary circuits on a particular network link, each primary circuit individually allocating primary bandwidth of the particular network link;
        establish one or more protection circuits on the particular network link configured to protect one or more other primary circuits in the network, the protection circuits collectively allocating shared backup bandwidth of the particular network link;
        assign each primary circuit to one of either:
            an individual primary weighted queue of the network link corresponding to a size of the individual primary circuit, or
            a shared primary weighted queue of the network link, wherein a total size of the shared primary weighted queue is equal to a total bandwidth of all primary circuits established on the network link;
        assign the one or more protection circuits collectively to a shared backup weighted queue of the network link, wherein a total size of the shared backup weighted queue is based on a maximum bandwidth needed to protect against a single failure of any one of one or more other primary circuits associated with the one or more protection circuits; and forward primary and backup packets on the particular network link according to the primary and backup weighted queues.

10. The apparatus as in claim 9, wherein the process when executed to forward is further operable to:

perform 1:1 protection operations based on the primary and backup queues.

11. The apparatus as in claim 9, wherein the process when executed is further operable to:

reallocate a portion of the shared backup bandwidth as primary bandwidth in response to a new active circuit on the particular network link, wherein the shared backup weighted queue is adjusted according to a resultant new size of the shared backup bandwidth for the particular network link.

12. The apparatus as in claim 11, wherein the new active circuit is a re-signaling of an old protection circuit of the one or more protection circuits established on the particular network link.

13. The apparatus as in claim 9, wherein establishing the one or more protection circuits comprises signaling an explicit indication of allowing allocation of shared backup bandwidth.

14. The apparatus as in claim 13, wherein signaling is based on a protocol selected from a group consisting of: resource reservation protocol (RSVP); and generalized MPLS (GMPLS).

15. The apparatus as in claim 9, wherein the primary and backup weighted queues are selected from a group consisting of: a weighted fair queue (WFQ); a deficit round robin (DRR) queue; and a deficit weighted round robin (DWRR) queue.

16. The apparatus as in claim 9, wherein the primary and protection circuits are multiprotocol label switching (MPLS) label switched paths (LSPs).

17. A tangible, non-transitory, computer-readable media having software encoded thereon, the software when executed by a processor operable to:

establish one or more primary circuits on a particular network link, each primary circuit individually allocating primary bandwidth of the particular network link;

establish one or more protection circuits on the particular network link configured to protect one or more other primary circuits in the network, the protection circuits collectively allocating shared backup bandwidth of the particular network link;

assign each primary circuit to one of either:

an individual primary weighted queue of the network link corresponding to a size of the individual primary circuit, or a shared primary weighted queue of the network link, wherein a total size of the shared primary weighted queue is equal to a total bandwidth of all primary circuits established on the network link;

assign the one or more protection circuits collectively to a shared backup weighted queue of the network link, wherein a total size of the shared backup weighted queue is based on a maximum bandwidth needed to protect against a single failure of any one of the one or more other primary circuits associated with the one or more protection circuits; and forward primary and backup packets on the particular network link according to the primary and backup weighted queues.

18. The computer-readable media as in claim 17, wherein the software when executed to forward is further operable to:

perform 1:1 protection operations based on the primary and backup queues.

19. The computer-readable media as in claim 17, wherein the software when executed is further operable to:

reallocate a portion of the shared backup bandwidth as primary bandwidth in response to a new active circuit on the network link, wherein the shared backup weighted queue is adjusted according to a resultant new size of the shared backup bandwidth for the network link.

20. The computer-readable media as in claim 19, wherein the new active circuit is a re-signaling of an old protection circuit of the one or more protection circuits established on the network link.

21. The computer-readable media as in claim 17, wherein establishing the one or more protection circuits comprises signaling an explicit indication of allowing allocation of shared backup bandwidth.

22. The computer-readable media as in claim 21, wherein signaling is based on a protocol selected from a group consisting of: resource reservation protocol (RSVP); and generalized MPLS (GMPLS).

23. The computer-readable media as in claim 17, wherein the primary and backup weighted queues are selected from a group consisting of: a weighted fair queue (WFQ); a deficit round robin (DRR) queue; and a deficit weighted round robin (DWRR) queue.

* * * * *